Oct. 6, 1970    H. B. HANS    3,532,635
OPACIFIED LIQUID PRODUCTS AND METHODS FOR THEIR PRODUCTIONS
Filed Dec. 29, 1966
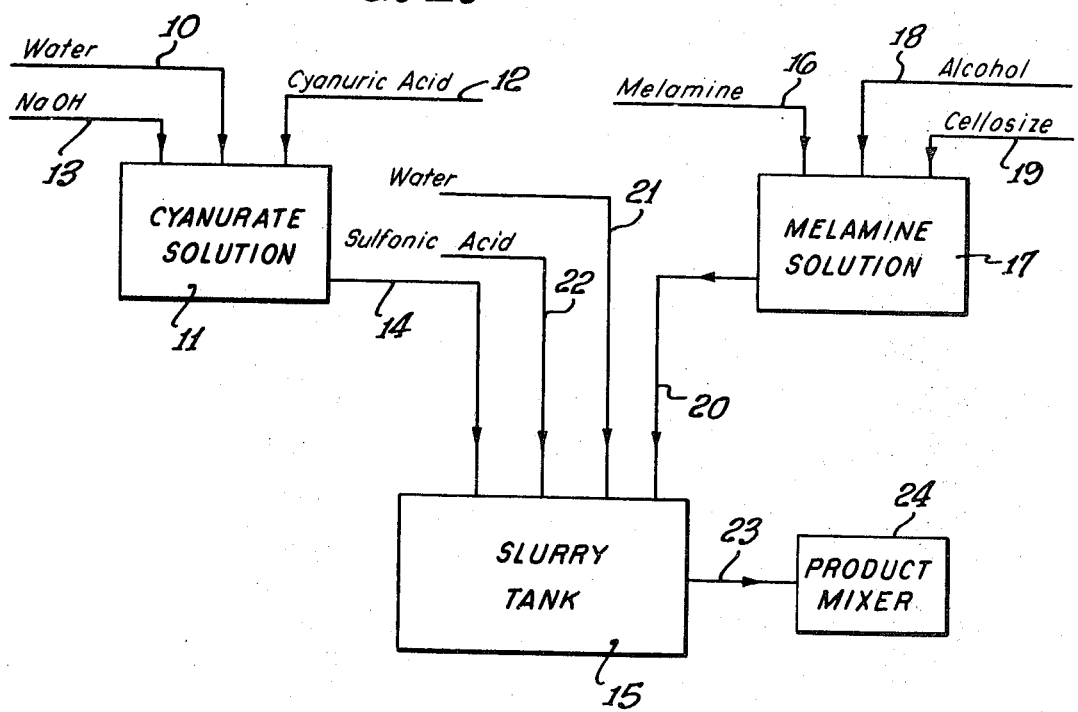
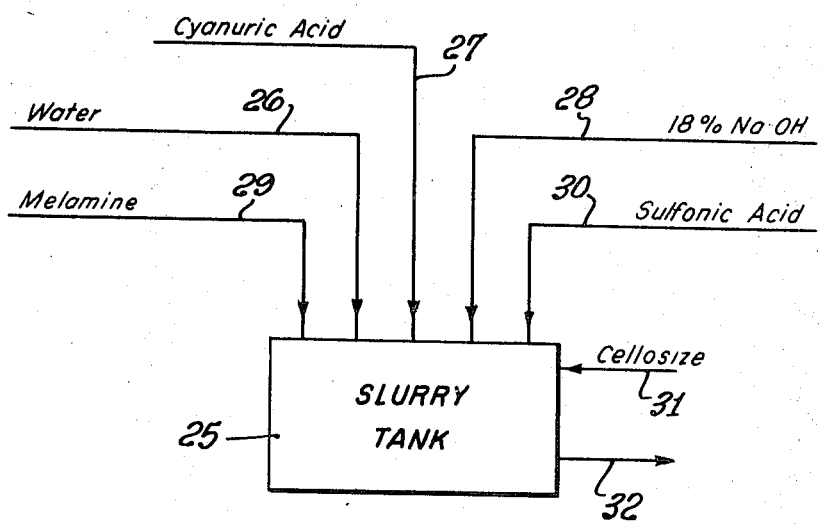
INVENTOR.
HARVEY B. HANS
BY
White & Haefliger
ATTORNEYS.

United States Patent Office 3,532,635
Patented Oct. 6, 1970

3,532,635
OPACIFIED LIQUID PRODUCTS AND METHODS
FOR THEIR PRODUCTIONS
Harvey B. Hans, Fountain Valley, Calif., assignor to Purex Corporation, Ltd., Lakewood, Calif., a corporation of California
Continuation-in-part of application Ser. No. 336,278, Jan. 7, 1964. This application Dec. 29, 1966, Ser. No. 606,509
Int. Cl. C11d 3/26
U.S. Cl. 252—152
9 Claims

ABSTRACT OF THE DISCLOSURE

Crystalline melamine cyanurate, prepared by reactions of cyanuric acid or a salt thereof with malamine is effective as an opacifying material for liquid products, such as detergent solutions by simple incorporation in effective amounts. Dependent on particle size, opacity and/or pearlescence is provided to the product.

This application is a continuation-in-part of my co-pending application, Ser. No. 336,278, filed Jan. 7, 1964 now abandoned.

This invention has to do generally with the opacification of liquid compositions and products which normally may be relatively translucent or at least to some extent transparent, and which desirably are given qualities of opacity. While in its broader aspects the invention contemplates no limitations as to specific compositions to the opacified, the invention has been occasioned by undertaking to provide improved methods and materials for opacifying such products as household liquid detergents, lotions, shampoos and the like, and accordingly the invention will be described with some particularity in regard typically to the opacifying of such products.

As a further generality, the invention contemplates the preparation of end products as later explained, as well as an opacifying suspension, itself useful as an opacifying additive in various final products.

Further, translucent to opaque products, such as starch dispersions, may be given a pearlescent cast by incorporation of certain of the opacifying suspensions herein disclosed.

Heretofore several methods have been used to opacify products such as liquid detergents. One approach has involved the use of high molecular weight fatty acid derivatives of low solubility. The presence of such materials in a liquid detergent is detrimental to foam stability. Hence, it is necessary to increase the surfactant level to compensate for the deficiency in foam, thereby increasing the cost of the formulation. Another method of opacifying liquid detergents has been to add emulsions of certain polymeric materials similar to those used in latex paints. These resin emulsions have the disadvantage that they require special equipment for production, hence they usually have to be purchased from companies having suitable equipment for their production. A further disadvantage is their instability, requiring that they be handled with a certain amount of care in order to avoid demulsification. For the same reason, great care has to be taken in how they are incorporated into the detergent formulation, and there are limitations on types of formulations with which they can be used.

This invention contemplates liquid products, comprising a liquid carrier and as an opacifier therein, a suspension of particulate melamine cyanurate, generally of a particle size less than about 0.5μ and in proportions to impart visual opacity to the liquid product, e.g. from 0.01 to 10% and more generally from 0.05 to 4.0%, by weight based on the total product.

The term "melamine cyanurate" herein refers to the reaction product of melamine and cyanuric acid or a salt thereof.

The invention provides for the formation of suspensions of melamine cyanurate in a liquid carrier by simple methods which, as will appear, permit of some variations by reason of the crystal growth control, of the visual effects of the salt crystals in the suspension as well as in the final product. That is, pearlescence can be imparted to liquid products by incorporation therein of relatively large melamine cyanurate particles, e.g. less than 15μ and in the range of 1 to 10μ in average particle size.

Generally, the preparative procedure followed is to react solutions of cyanuric acid or a soluble cyanurate and melamine. Aqueous cyanuric acid solutions having concentrations up to around 9% can be prepared by dissolution of an alkali metal salt of the acid, and aqueous melamine solutions may be made at concentrations ranging from about 0.5% at room temperature to about 3% at 90° C.; using an organic solvent, e.g. ethylene glycol, melamine solutions of as high as 3% can be prepared at room temperatures. Employing the particular procedures described later in reference to the drawing, the opacifying crystal content of the suspension typically is in the range below about 4% by weight at normal temperatures.

Opacity is produced in a product merely by dispersing the particulate melamine cyanurate in the liquid carrier component of the product such as an aqueous or water-alcohol base. When first prepared, melamine cyanurate may not form crystals due to the high alkalinity of the reaction solution, generally a pH of 11.1 or higher. It has been found that acidifying this solution to a pH less than 11.1 and preferably to between pH 3 and 11 forms a medium in which melamine cyanurate is a solid crystalline product. Most detergent compositions will have pH levels between 6 and 8 and thus melamine cyanurate is an ideal opacifier for them.

Dependent on crystal size of the melamine cyanurate, vehicle viscosity, environmental conditions, e.g. temperature and length of storage it may be desirable, if one or more of these factors tend to permit settling of the crystals from the suspending vehicle to incorporate one or more suspending agents which, by alteration of suspension viscosity, electrical balances within the suspension, or miscibility properties of the suspension components through a loose physical association, stabilize the suspension against undue settling during the normal shelf life of the product being opacified. Generally the suspending agent is employed in proportions of 1:5 to 5:1 based on the weight of the malamine cyanurate present, and preferably at about equal proportions, and thus at concentrations of from 0.01 to 10% and preferably 0.05 to 4% by weight of the total product.

Among typical suspending agents are hydroxylated organic compounds and polymers including completely or partially hydrolyzed polyvinyl acetates, polyacrylates, polymethacrylates, polysaccharides, e.g. starch, dextrin, glycogen and inulin, polymers having the general formula

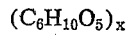

or

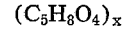

wherein $x$ is an integer of at least 3, and their derivatives particularly ester derivatives with monocarboxylic aliphatic acids or anhydrides having 2 to 6 carbon atoms inclusive; and cellulose and its derivatives, e.g. with the aforementioned acids such as cellulose acetates and including alkyl celluloses and substituted alkyl celluloses particularly hydroxyalkyl celluloses and alkoxyalkyl celluloses among which there may be mentioned hydroxyethyl cellulose, methyl cellulose, hydroxymethyl cellulose, hydroxypropyl methyl cellulose, carboxymethyl cellulose and cellulose gum, gums, including gum aribic and gum tragacanth; algin; gelatin and chitin derivatives.

In addition, detergent materials themselves will function as suspension agents, as is well known, so that the hereinafter described detergents can be used as suspending agents per se or in detergent formulations as a suspending agent in lieu of another type of agent.

Of course any of the foregoing suspension agents can be used in an appropriate case with one or more of the detergents hereinafter named as illustrated in the examples.

Materials useful as suspension agents may be useful, when mixed with melamine cyanurate as final products themselves. For example, starch is a useful end product in and of itself which may be rendered pearlescent by incorporation of properly sized crystals of melamine cyanurate.

Illustrative procedures for making suspensions of melamine cyanurate, with or without special provisions for the imparting of a pearlescent appearance, are now explained in reference to the accompanying flow sheet drawing in which:

FIG. 1 shows an illustrative procedure for making melamine cyanurate suspension and end products; and FIG. 2 illustrates a variational method of preparing similar products in which the melamine cyanurate is given crystal growth resulting in pearlescent appearance in the product.

In the preparation of an opacifier slurry according to the system of FIG. 1, water is introduced from line 10 to tank 11 into which is charged cyanuric acid at 12 followed by 18% caustic soda solution from line 13, all typically in the proportions of about five parts cyanuric acid, 70 parts water and 25 parts 18% caustic solution. Given adequate mixing, the caustic soda reacts with the acid to form a solution of sodium cyanurate available for delivery through line 14 to the reaction and slurry tank 15.

Melamine suspension is formed by delivering melamine through line 16 to tank 17 into which has been fed a suitable alcohol such as ethyl alcohol supplied through line 18 for dissolution or dispersion of the melamine. Following introduction of the alcohol and melamine, a suspending aid such as "Cellosize" is introduced to the tank through line 19. Three components are proportioned to provide in the tank 17 a suspension typically of two parts melamine, 6.4 parts Cellosize and 91.6 parts alcohol. This mixture becomes available for introduction to the tank 15 through line 20.

The melamine cyanurate suspension is formed in tank 15 by first introducing thereto water through line 21 followed by the described melamine solution from line 20 and then cyanurate solution from line 14. Given a desired degree of mixing and agitation, the sodium cyanurate and melamine react stoichiometrically to form melamine cyanurate in a water and alcohol solution of the Cellosize. Upon completion of the reaction the solution is adjusted in pH as necessary by acid introduced through line 22 to bring the solution pH to a level at which melamine cyanurate is insoluble, i.e. a pH of less than 11.1. In general, I may employ any suitable acid that may be compatible in or with the final product, although an organic acid will be used in most instances. A sulfonic acid such as dodecylbenzene sulfonic acid is satisfactory for the neutralization of a slurry to be used in opacifying liquid detergents. Typically the feed proportions going to tank 15 may be about 9.6 parts water, 2.5 parts melamine solution, 1 part cyanurate solution and 0.24 part alkylbenzene sulfonic acid, resulting in a suspension containing about 0.75% melamine cyanurate and 1.20% Cellosize, 1.65% sodium sulfonate, 17.17% alcohol and 79.23% water.

The suspension thus produced may be used per se or as a base for opacifying any of various final products in the categories hereinabove indicated. Thus for preparation in a connected system, a proper quantity of the suspension may be delivered through line 23 to tank 24 for mixing with the final product composition to be opacified.

The method as explained in reference to FIG. 1 may be used for the formation and use of melamine cyanurate essentially for its property as a visual opacifier. The method now to be explained in reference to FIG. 2 also is productive of a cyanurate suspension which also may serve essentially as an opacifier but which has the additional property of imparting the optical effect of pearlescence to the suspension and any final product.

The system of FIG. 2 employs a reaction and slurry tank 25 to which is introduced water from line 26 followed by cyanuric acid from line 2 and then 18% caustic soda from line 28. These typically may be used in the proportions of about 14.7 parts water, 1 part cyanuric acid and 5 parts 18% caustic solution. Following conversion of the cyanuric acid to soluble sodium syanurate, 1 part melamine is introduced to the tank from line 29 and the solution agitated to bring about reaction of the cyanurate and melamine to form melamine cyanurate. It will be noted that the melamine is not added until after introduction of the caustic, in order to prevent immediate reaction of the melamine with the cyanuric acid in a manner forming non-pearlescent crystals. At the high alkalinity resulting from the caustic salt of cyanuric acid, pH over 11.1, melamine cyanurate will not precipitate from the solution so that a solution and not a suspension is obtained. By then adding alkylbenzene sulfonic acid, however, through line 30 at a controlled rate, and ultimately in an amount sufficient to lower the pH to less than 11.1, the melamine cyanurate precipitates in the form of pearlescent crystals having their pearlescent properties and quality apparently as a result of the formation of larger size crystals than those resulting from the FIG. 1 procedure. The resulting pearlescent suspension may contain about 7.5% pearlescent melamine cyanurate, 17.6% alkylbenzene sulfonate and 74.9% water. This product then may have added a suspension agent such as Cellosize from line 31 followed by thorough agitation and mixing. As before, the suspension may be withdrawn through line 32 for addition to selected final products.

The use of particulate melamine cyanurate as an opacifier is particularly well suited to detergent or surface-active formulation. In general, any detergent material anionic, nonionic or cationic, organic or inorganic such as phosphate can be opacified with particulate melamine cyanurate. In end use formulations concentrations in aqueous or alcoholic aqueous media of detergent or surface active material will range from just significant to 2% to 40% and higher.

In general, suitable non-ionic detergents include water soluble non-ionic polyalkylene oxide detergents such as produced by the introduction of alkylene oxide group into an organic hydrophobic compound or group having an aliphatic or aromatic structure. The hydrophobic organic group generally contains at least 8 carbon atoms and up to about 30 carbon atoms. Condensed with the hydrophobic group are at least 5 and preferably up to about 50 alkylene oxide groups. It is preferred to use the polyoxyethylene condensates derived from ethylene oxide. Among the non-ionic detergents, it is preferred to use the polyalkylene oxide condensates of alkyl phenol, such as the polyoxyethylene ethers of alkyl phenols having an alkyl group of at least about six, and usualy about 8 to 12 carbons, and an ethylene oxide ratio (number of moles per phenol) of about 7.5, 8.5, 11.5 and 20, though the number of ethylene oxide groups will be usually from about 8 to 18. The alkyl substituent on the aromatic nucleus may be di-isobutylene, diamyl, polymerized propylene, dimerized $C_6$–$C_7$ olefin, and the like.

Further suitable detergents are the polyoxyalkylene esters of organic acids, such as the higher fatty acids, rosin acids, tall oil acids, or acids from the oxidation of petroleum, et cetera. These polyglycol esters will contain usually from about 12 to about 30 moles of ethylene oxide or its equivalent and about 8 to 22 carbons in the acyl group. Suitable products are refined tall oil condensed with 16 or 20 ethylene oxide groups, or similar polyglycol esters of lauric, stearic, oleic acids, etc.

Additional non-ionic agents are the polyalkylene oxide condensates with higher fatty acid amides, such as the higher fatty acid primary amides, mono- and di-ethanolamides. Suitable agents are coconut fatty acid amide condensed with about 10 to 50 moles of ethylene oxide. The fatty acyl group will have similarly about 8 to 22 carbons, and usually about 10 to 18 carbon atoms, in such products. The corresponding sulfonamides may be used also if desired.

Other suitable polyether non-ionic detergents are the polyalkylene oxide ethers of higher aliphatic alcohols. Suitable fatty alcohols having a hydrophobic character, preferably 8 to 22 carbons, are lauryl, myristyl, cetyl, stearyl and oleyl alcohols which may be condensed with an appropriate amount of ethylene oxide, such as at least about 6, and preferably about 10 to 30 moles. A typical product is oleyl alcohol condensed with about 12, 15 or 20 moles of ethylene oxide. The corresponding higher alkyl mercaptans or thioalcohols condensed with ethylene oxide are suitable in the present invention also. The water-soluble polyoxyethylene condensates with hydrophobic polyoxypropylene glycols may be employed also.

Further suitable non-ionic detersive materials are the higher fatty acid alkanolamides, such as the monoethanolamides, diethanolamides and isopropanolamides wherein the acyl radical has about 10 to 14 carbon atoms and amine oxides. Examples are coconut (or equivalent lauric), capric and myristic diethanolamide, monoethanolamide and isopropanolamide, dodecyl dimethyl amine oxide and dimethyl acetoxyalkylamine oxide where alkyl is $C_{11}-C_{14}$.

Other suitable synthetic detergents the anionic aromatic detergents, e.g. water-soluble higher alkyl aryl sulfonate detergents particularly those having from 8 to about 15 carbon atoms in the alkyl group. It is preferred to use the higher alkyl benzene sulfonate detergent for optimum effects, though other similar detergents having a mononuclear aryl nucleus, such as toluene, xylene, or phenol, may be used also. The higher alkyl substituent on the aromatic nucleus may be branched or straight-chained in structure, examples of such group being nonyl, dodecyl and pentadecyl groups derived from polymers of lower mono-olefins, decyl, keryl, and the like.

Illustrative of suitable aliphatic anionic detergents are the normal and secondary higher alkyl sulfonate detergents, particularly those having about 8 to 15 carbons in the fatty alcohol residue, such as lauryl (or coconut fatty alcohol) sulfate. Other suitable detergents are the sulfuric acid esters of polyhydric alcohols incompletely esterified with higher fatty acids, e.g. oleic acid ester of isothionic acid; the higher fatty acid (e.g. coconut) ethanolamide sulfate; the higher fatty acid amide of amino alkyl sulfonic acids, e.g. lauric acid amide of taurine; and the like.

These sulfate and sulfonate detergents are used in the form of their water-soluble salts, such as the alkali metal and nitrogen-containing, e.g. lower alkylolamine, salts. Examples are the sodium, potassium, ammonium, isopropanolamine, mono- and tri-ethanolamine salts of said higher alkyl benzene sulfonate, higher alkyl sulfate and the like. In commercial practice, it is preferred to use the alkali metal salts.

Typical specific examples are: the sodium salt of a sulfate ester of an alkylphenoxypoly (ethyleneoxy) ethanol, the ammonium salt of this sulfate ester, sodium methyl oleyl taurate, sodium alkyl naphthalene sulfonate, alkyl acyl sodium sulfonate, sodium tetrahydronaphthalene sulfonate, sodium alkyl aryl sulfonate, alkyl amido sulfate, cocomonoglyceride sulfate, dodecylbenzene sodium sulfonate, dodecylbenzene sulfonic acid, tridecylbenzene sodium sulfonate, fatty alcohol sodium sulfate, sodium dodecyl diphenyl oxide disulfonate, sulfonated castor oil, polyethoxyalkyl phenol sulfonate triethanolamide salt, sodium triethanolamine alkyl aryl sulfonate, magnesium lauryl sufate, potassium lauryl sulfate, sodium lauryl ether sulfate, ammonium lauryl ether sulfate, sodium tallow sulfate, dodecylbenzene sodium sulfonate, oleyl methyl tauride, ammonium lauryl sulfate, amide sulfonate, and the like.

Other suitable synthetic detergents are cationic detergents such as the amines particularly primary fatty amines such as lauric amine, myrstic amine, palmitic amine, stearic amine, oleyl amine, linoleyl amine, coco amine and tallow amine. Also N-fatty propylene diamine and heterocyclic tertiary amines as well as fatty halides, e.g. stearyl dimethyl benzene ammonium chloride, dodecylbenzene chloride, lauryl pyridinium chloride and sulfates, e.g. lauryl pyridinium bisulfate can be used.

Amphoteric detergent materials can also be employed including illustratively the sodium salt of N-coco beta amino propionate, N-lauryl beta amine propionic acid and metal salts of substituted quaternary hydroxy cycloimidinic acid metal alcoholates such as disclosed in U.S. Patent 2,528,378 to Mannheimer.

The following are illustrative examples of final products which may contain the melamine cyanurate suspension to impart an essentially opaque or pearlescent quality to the product. In each of these examples, any of the components may be used in any quantity within its respective percentage range.

EXAMPLE I

Liquid detergent

| | Percent |
|---|---|
| Ammonium linear dodecylbenzene sulfonate | 15–30 |
| Ammonium tetraethoxy secondary alcohol sulfate | 7–20 |
| Diethanol amide of lauric acid | 1.5–7.0 |
| Ethanol | 10–20 |
| Hydroxyethyl cellulose | 0.05–4.0 |
| Melamine cyanurate | 0.05–4.0 |
| Water, q.s. | |

EXAMPLE II

Shampoo

| | Percent |
|---|---|
| "Duranol XL"[1] | 12–25 |
| Diethanolamide of lauric acid | 1–7 |
| Melamine cyanurate | 0.05–4 |
| Water, q.s. | |

EXAMPLE III

Bubble bath

| | Percent |
|---|---|
| Ammonium alkylbenzene sulfonate | 15–30 |
| Ammonium linear nonylphenoxy tetraethoxy ethanol sulfate | 5–15 |
| Diethanol amide of lauric acid | 1–7 |
| Ethanol | 12–25 |
| Ethyl cellulose | 0.05–4 |
| Melamine cyanurate | 0.05–4 |
| Water q.s. | |

EXAMPLE IV

Laundry starch

| | Percent |
|---|---|
| Corn starch | 2–15 |
| Sodium chloride | 2–15 |
| Sulfonated castor oil | 0.01–0.5 |
| Sodium ortho-phenyl phenoxide | 0.01–0.1 |
| Melamine cyanurate | 0.05–4.0 |
| Perfume, dye and water, q.s. | |

I claim:

1. Opacified liquid product consisting essentially of an aqueous liquid carrier, from 2 to 40% by weight of an anionic, cationic, nonionic or amphoteric detergent compound soluble in said carrier and a suspension of particulate melamine cyanurate having a particle size less than 15μ in proportions between 0.01 and 10% by weight sufficiently to impart visual opacity to the product.

2. Product according to claim 1 in which said detergent is a higher alkyl aryl sulfonate in which the alkyl group contains 8 to 15 carbon atoms.

3. Product according to claim 1 including also from 0.01 to 10% by weight of a suspending agent selected from the group consisting of hydroxyethyl cellulose, methyl cellulose, hydroxymethyl cellulose, hydroxy propyl methyl cellulose, carbonymethyl cellulose, cellulose gum, gum arabic, gum tragacanth, algin, gelatin, chitin derivates, hydrolyzed polyvinyl acetates, polyacrylates and polymethacrylates, polysaccharides having the formula $(C_6H_{10}O_5)_x$ and $(C_5H_8O_4)_x$ where $x$ is an integer equal to at least 3, and ester derivatives of these polysaccarides with acids having 2 to 6 carbon atoms inclusive.

4. Opacified product according to claim 1 in which said melamine cyanurate has a particle size between about 1 and 10μ to give the product a pearlescent appearance.

5. Opacified product according to claim 1 in which said aqueous carrier is an aqueous-alcoholic carrier.

6. Product according to claim 2 in which the aryl group is mononuclear.

7. Product according to claim 1 in which said detergent is a higher alkyl sulfate detergent in which the alkyl group contains from 8 to 15 carbon atoms.

8. Opacified liquid product consisting essentially of a mixture of from 2 to 40% by weight of a water soluble alkyl aryl sulfonate wherein the alkyl group contains from 8 to 15 carbon atoms and the aryl group is mononuclear, from 0.01 to 10% by weight of a suspension of particulate melamine cyanurate having a particle size less than 15μ and the balance water.

9. Product according to claim 1 including an aqueous carrier having a pH between 3 and 11.

References Cited

UNITED STATES PATENTS 2,822,270   2/1958   Kirkpatrick et al.
                                       260—249.6 X
2,999,093   9/1961   Christian _____ 260—2496. X MAYER WEINBLATT, Primary Examiner M. HALPERN, Assistant Examiner U.S. Cl. X.R.

252—137, 161; 260—2496

UNITED STATES PATENT OFFICE
CERTIFICATE OF CORRECTION

Patent No. 3,532,635          Dated October 6, 1970

Inventor(s) Harvey B. Hans

It is certified that error appears in the above-identified patent and that said Letters Patent are hereby corrected as shown below:

Column 6, the line between line 49 and line 50; should read --$^1$Modified Alcohol Sulfate by DuPont--

Column 7, line 4; "sufficiently" should read --sufficient--

This certificate supersedes Certificate of Correction issued December 29, 1970.

Signed and sealed this 2nd day of March 1971.

(SEAL)
Attest:

EDWARD M. FLETCHER, JR.
Attesting Officer

WILLIAM E. SCHUYLER, JR.
Commissioner of Patents